US010902207B2

(12) United States Patent
Guerra et al.

(10) Patent No.: US 10,902,207 B2
(45) Date of Patent: Jan. 26, 2021

(54) IDENTIFYING APPLICATION SOFTWARE PERFORMANCE PROBLEMS USING AUTOMATED CONTENT-BASED SEMANTIC MONITORING

(71) Applicant: International Business Machines Corporation, Armonk, NY (US)

(72) Inventors: Victoria Lee Guerra, Yorktown Heights, NY (US); Larisa Shwartz, Greenwich, CT (US); John R. Davis, Winchester (GB); Jinho Hwang, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 124 days.

(21) Appl. No.: 16/130,418

(22) Filed: Sep. 13, 2018

(65) Prior Publication Data
US 2020/0089761 A1 Mar. 19, 2020

(51) Int. Cl.
*G06F 40/30* (2020.01)
*G06K 9/62* (2006.01)
(Continued)

(52) U.S. Cl.
CPC .............. *G06F 40/30* (2020.01); *G06F 16/35* (2019.01); *G06F 16/367* (2019.01);
(Continued)

(58) Field of Classification Search
USPC ...................................................... 704/1–504
See application file for complete search history.

(56) References Cited

U.S. PATENT DOCUMENTS 5,357,452 A 10/1994 Pio-Di-Savoia et al.
6,505,342 B1 1/2003 Hartmann et al.
(Continued)

OTHER PUBLICATIONS

Despeyroux et al., "Semantic Verification of Web Sites Using Natural Semantics," Content-Based Multimedia Information Access, vol. 1, Le Centre De Hautes Etudes Internationales D'Informatique Documentaire, 2000, 11 pages.
(Continued)

*Primary Examiner* — Marcus T Riley
(74) *Attorney, Agent, or Firm* — Cantor Colburn LLP; Abdy Raissinia

(57) ABSTRACT

Embodiments are directed to computer-implemented methods of operating a monitoring host of a performance management infrastructure. The method includes receiving, using natural language processing (NLP) algorithms, training data that includes operational data and functionality data. The operational data represents natural language descriptions of performance problems identified for an application computer program running a computing system. The functionality data represents natural language descriptions of functional capabilities of the application computer program. The NLP algorithms and a classifier are used to extract features of the training data. The extracted features are used to build a semantic correlation model that includes correlated data sets, wherein each of the correlated data sets includes functionality data and operational data having a semantic correlation to functionality data. One of the correlated data sets is selected and used to create an application monitoring algorithm configured to submit requests to and receive responses from the application computer program.

20 Claims, 9 Drawing Sheets

(51) Int. Cl.
*G06N 20/00* (2019.01)
*G06F 16/35* (2019.01)
*G06F 16/36* (2019.01)
*G06F 16/9032* (2019.01)

(52) U.S. Cl.
CPC ..... *G06F 16/90332* (2019.01); *G06K 9/6256* (2013.01); *G06N 20/00* (2019.01)

(56) References Cited

U.S. PATENT DOCUMENTS

| | | | |
|---|---|---|---|
| 6,735,592 B1* | 5/2004 | Neumann | G06F 16/951 |
| 7,627,671 B1 | 12/2009 | Palma et al. | |
| 7,900,201 B1 | 3/2011 | Qureshi et al. | |
| 8,038,614 B2 | 10/2011 | Gobeyn et al. | |
| 8,260,773 B2 | 9/2012 | Jennings, III et al. | |
| 8,346,563 B1* | 1/2013 | Hjelm | G10L 15/1822 |
| | | | 379/88.01 |
| 8,473,922 B2* | 6/2013 | Li | G06F 11/3612 |
| | | | 717/130 |
| 8,515,999 B2* | 8/2013 | de Cerqueira Gatti | G06F 16/88 |
| | | | 707/791 |
| 10,177,998 B2* | 1/2019 | Parandehgheibi | H04L 45/306 |
| 10,230,597 B2* | 3/2019 | Parandehgheibi | G06F 16/162 |
| 10,489,433 B2* | 11/2019 | Wieweg | G06F 16/3329 |
| 2003/0005413 A1* | 1/2003 | Beer | G06F 11/3664 |
| | | | 717/125 |
| 2005/0043940 A1* | 2/2005 | Elder | G06F 16/24522 |
| | | | 704/9 |
| 2005/0251570 A1 | 11/2005 | Heasman et al. | |
| 2007/0288419 A1 | 12/2007 | Strassner | |
| 2010/0042468 A1 | 2/2010 | Doan et al. | |
| 2013/0185307 A1* | 7/2013 | El-Yaniv | G06N 20/00 |
| | | | 707/748 |
| 2013/0268260 A1* | 10/2013 | Lundberg | G06F 40/40 |
| | | | 704/8 |
| 2014/0019116 A1* | 1/2014 | Lundberg | G06F 8/30 |
| | | | 704/8 |
| 2015/0082432 A1 | 3/2015 | Eaton et al. | |
| 2015/0309813 A1 | 10/2015 | Patel | |
| 2015/0339376 A1* | 11/2015 | Wieweg | G06N 20/00 |
| | | | 707/739 |
| 2018/0157762 A1* | 6/2018 | Tee | G06F 16/9535 |
| 2018/0165554 A1* | 6/2018 | Zhang | G06K 9/6256 |
| 2020/0089761 A1* | 3/2020 | Guerra | G06F 40/30 |

OTHER PUBLICATIONS

Dijkman et al., "Semantic Verification of Behavior Conformance," Proc. of the 11th Workshop on Behavioral Semantics, 2002, 12 pages.

Nebut et al., "Automatic Test Generation: A Use Case Driven Approach," IEEE Transactions on Software Engineering, 32.3, 2006, pp. 140-155.

* cited by examiner

| TICKET ID | SUMMARY | RESOLUTION |
|---|---|---|
| 1 | THE LOGICAL DISK HAS A LOW AMOUNT OF FREE SPACE. PERCENT AVAILABLE: 2 THRESHOLD: 5 | AFTER DELETING OLD UNINSTALL FILES, THE LOGICAL DISK HAS NOW OVER 10% OF FREE DISK SPACE. |
| 2 | THE PERCENTAGE OF USED SPACE IN THE LOGIC DISK IS 90 PERCENT. THRESHOLD: 90 PERCENT | AFTER DELETING OLD UNINSTALL FILES, THE LOGICAL DISK HAS NOW OVER 15% OF FREE DISK SPACE. |
| 3 | FILE SYSTEM IS LOW, THE PERCENTAGE OF AVAILABLE SPACE IN THE FILE SYSTEM IS 10 PERCENT. THRESHOLD: 90 PERCENT | AFTER DELPROF RUN, THE HOST NOW HAS MORE THAN 4GB OF FREE SPACE |
| 4 | THE LOGICAL DISK HAS A LOW AMOUNT OF FREE SPACE. PERCENT AVAILABLE: 3 THRESHOLD: 5 | NO TROUBLE WAS FOUND, SITUATION NO LONGER PERSISTS. |

502

| topicID | DESCRIPTION | RESOLUTION |
|---|---|---|
| 14 | TRANSFORMATION METRIC FOR MONITORING OPPORTUNITY IS NOT IN ACCORDANCE TO OTHER TWO OPPORTUNITY METRICS. THIS IS ON CROSS-ACCOUNT PAGE. | THE MONITORING OPPORTUNITY METRIC DID NOT TAKE INTO ACCOUNT 'IBM SCOPE' (COLUMN AB). IT HAS BEEN FIXED. |
| 14 | ACCOUNT XXX HAS TRANSFORMATION METRICS WHICH CONTRADICT ONE TO ANOTHER. | THIS ACCOUNT HAS LARGE NUMBER OF TICKETS FROM NON-IBM SCOPE. NOW IT IS BEING CONSIDERED. |

IDENTIFYING APPLICATION SOFTWARE PERFORMANCE PROBLEMS USING AUTOMATED CONTENT-BASED SEMANTIC MONITORING

BACKGROUND

The present invention relates generally to programmable computer systems, and more specifically to computer-implemented methods, computer systems and computer program products configured and arranged to identify and prioritize application software performance problems using automated and novel content-based semantic monitoring techniques.

Known performance monitoring infrastructure (PMI) systems monitor performance metrics of deployed application software to identify performance problems and maintain an expected level of service. In general, PMI systems focus on two types of performance metrics. The first type of performance metric defines the performance experienced by end users of the application software. An example of such a performance metric is the average response times of an application under peak load. An application's response time can change when it is loaded by electronic demands for searches, calculations, transmissions, etc., which is why programmers may or may not catch performance problems during development. The second type of performance metric measures the computational resources used by the application for the load, thus indicating whether there is adequate capacity to support the load, as well as possible locations of a performance bottleneck. Tracking the second type of performance metric establishes an empirical performance baseline for the application. The baseline can then be used to detect changes in performance, which can be correlated with external events and subsequently used to predict future changes in application performance. PMI is particularly useful in web-based applications where consistent speed and uptime are expected but frequently disrupted.

SUMMARY

Embodiments of the invention are directed to a computer-implemented method of operating a host of a performance management infrastructure. A non-limiting example of the computer-implemented method includes receiving, using natural language processing (NLP) algorithms of the host, training data that includes operational data and functionality data. The operational data represents natural language descriptions of performance problems identified for an application computer program running a computing system. The functionality data represents natural language descriptions of functional capabilities of the application computer program. The NLP algorithms and a classifier of the host are used to extract features of the training data. The extracted features are used to build a semantic correlation model that includes correlated data sets, wherein each of the correlated data sets includes functionality data and operational data having a semantic correlation to functionality data. At least one of the correlated data sets is selected and used to create an application monitoring algorithm configured to submit requests to and receive responses from the application computer program running on the computing system.

Embodiments are further directed to a computer systems and computer program products having substantially the same features as the above-described computer-implemented method.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

FIG. 5 is a diagram illustrating aspects of the invention;

Figure 1:
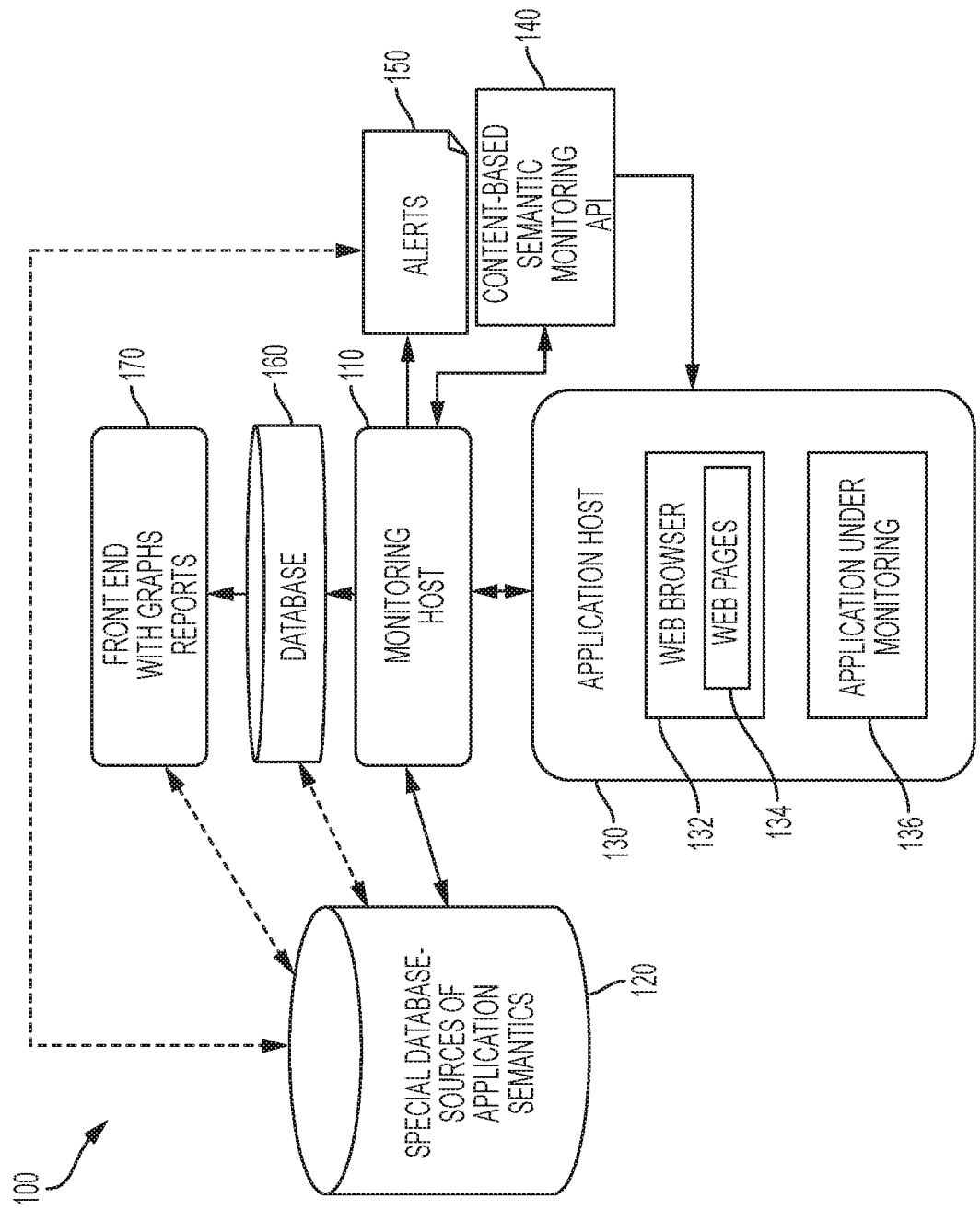
FIG. 1 is a block diagram of a PMI system embodying aspects of the invention.

In the accompanying figures and following detailed description of the disclosed embodiments, the various elements illustrated in the figures are provided with three digit reference numbers. The leftmost digit of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, include the module and achieve the stated purpose for the module.

Turning now to a more detailed description of technologies that are more specifically related to aspects of the invention, the term "software" refers to the set of electronic program instructions or data a computer processor reads in order to perform a task or operation. There are two main categories of software, namely systems software and application software. Systems software includes the programs that are dedicated to managing the computer itself, such as the operating system, file management utilities, and disk operating system (or DOS). Application software enables the end-user to complete tasks such as creating documents, spreadsheets, databases, and publications; doing online research; sending email; designing graphics; running businesses; and even playing games. Application software can be installed locally on the end-user's computer or mobile device, or it can be stored on the cloud and accessed by any Internet-connected device. Application software is specific to the task for which it was designed and can be as simple as a calculator application or as complex as a word processing application. A web browser is an application specifically designed to locate, retrieve, and display content found on the Internet. By clicking a hyperlink or by typing the URL of a website, a user is able to view websites formed from one or more web pages.

The phrase "software development life cycle" (SDLC) refers to the stages of a process used in developing a software product. The phrase "software release life cycle" (SRLC) refers to the stages of a process used to release and deliver the software product to its intended users. SDLC and SRLC processes ensure that software applications proceed from coding to final release in a timely and well defined manner. So-called "agile" versions of SDLC and SRLC processes have been developed to enable software to be released faster and more frequently. Agile software development is routinely applied to virtually every type and size of application software, including applications designed for less critical tasks (e.g., creating a report) and/or applications that deliver mission critical functionality or content.

The use of agile software development/release processes naturally means that pre-deployment testing will be condensed and in some instances not performed. Although some form of PMI has been used over the years to monitor the performance of deployed software, the role of PMI is even more important when the monitored software is an agile software deployment. PMI systems are particularly useful in web-based applications where consistent speed and uptime is expected but frequently disrupted. For example, PMI can be used to monitor the speed at which software application transactions are performed by end-users, as well as monitor the systems and network infrastructure that support the application, thereby providing an end-to-end overview of potential bottlenecks and application service interruptions.

In general, known PMI systems use a variety of computer hardware tools (e.g., a monitoring server communicatively coupled to a network of computers) and software tools that monitor metrics associated with the execution, availability, and user experience of deployed software to ensure a steady baseline of performance. In its most basic configuration, PMI systems include so-called "monitoring" software programs that periodically place a load (e.g., make a request) on monitored portion(s) of the target application and bring back the response that results from the load. Such monitoring software programs are typically implemented as application programming interfaces (APIs). The monitoring software applies rules to the responses received at the API to determine if the responses are anomalous or non-anomalous. If a given response is non-anomalous, no action is taken. If a response is anomalous, a description of the anomaly is recorded in the form of a ticket that includes a narrative that identifies the problem. The ticket is typically catalogued and verified, and then a solution (e.g., a software patch) is generated and implemented as needed. When a problem described in a ticket has been resolved, the ticket is typically updated to reflect the resolution. Vendors also use tickets as a guide for generating so-called "test cases," which are small programs that are run on an operating system to verify quality.

Despite the importance of PMI systems in general, and particularly in the context of agile software development/deployment, there are still shortcomings. Known PMI systems are metric-based, which means that they are limited to monitoring temporal aspects of an application's performance that can be measured and captured numerically. For example, known PMI systems monitor metrics such as how quickly a webpage loads or how long it takes for an application under monitoring to receive request A, process request A, and provide a response to request A. Aspects of an application's performance that cannot be captured numerically are missed by known metric-based PMI systems. Additionally, because it is inefficient to indiscriminately monitor every aspect of an application and the computer system on which it runs, strategic decisions have to be made about what to monitor, how to prioritize anomalous results that are returned by the monitor, and how to make necessary adjustments to what is being monitored over time. Thus, setting up and maintaining application monitoring using known PMI systems can require a significant upfront and ongoing investment of time and resources.

Turning now to an overview of aspects of the present invention, embodiments of the invention are directed to computer-implemented methods, computer systems and computer program products configured and arranged to provide an improved PMI system that incorporates novel and automated content-based semantic monitoring techniques configured to identify application software performance problems. As used in this specification, the phrase "content-based semantic monitoring" means application monitoring techniques that focus on and analyze aspects of the content of what an application software program (and the computer system on which the application is running) returns to and displays for the end-user. For example, in a web-based application software program, the end-user can request that the application perform a web search for the social media accounts of John Doe. If the application returns a blank page, and if the blank page is returned because there is no data reflecting social media accounts for John Doe, the application software has performed appropriately and there is no anomaly. However, if the application returns a blank page because of a coding problem in the application software, the blank page would represent an anomaly. In this example, the "content" of what is returned by the application is the blank page, and a PMI system configured to incorporate the disclosed the content-based semantic monitoring techniques in accordance with aspects of the present invention can be used to analyze a variety of semantic-based or content-based data associated with the application software program to automatically determine whether the content of the blank page returned and displayed by the application software is an anomaly or a non-anomaly.

As another example, an end user requests that the application software generate a report identified as a Daily Production Report (DPR). The application software is configured to, under normal operation, automatically and without user intervention place the current date in the upper left corner of each DPR it generates. The automated date feature is a new function provided in the latest version of the application software and was highlighted in the application's user manual and other client communications as one of the application's important new functions. An end-user requests a DPR, and the application returns the DPR but without the current date automatically populated in the upper left corner of the DPR. Another end-user requests a DPR, and the application returns the DPR with the current date automatically populated but it is in the lower right corner of the DPR. Another end-user requests a DPR, and the application returns the DPR with a date automatically populated in the upper left corner of the DPR but it is not the current date. In this example, the "content" of what is returned by the application is the current date positioned in the upper left corner of a DPR, and a PMI system configured to incorporate the disclosed the content-based semantic monitoring techniques in accordance with aspects of the invention can be used to analyze a variety of semantic-based or content-based data associated with the application software program to automatically determine whether the content of the DPR returned and displayed in the above examples is an anomaly or a non-anomaly.

A PMI system in accordance with aspects of the invention includes a variety of computer hardware tools and software tools configured and arranged to automatically identify content-based application software performance problems, prioritize the identified content-based application software performance problems, generate/implement semantic monitoring systems (e.g., application programming interfaces (APIs)) targeted to the identified and prioritized content-based application software problems, and utilize the outputs of the semantic monitoring system to generate content-based semantic alerts and train and make learning-based adjustments to the novel and automated semantic monitoring techniques. In aspects of the invention, the PMI computer hardware tools include a monitoring host system (e.g., a server, a virtual machine, a processor, a container, and the like) communicatively coupled to a network of computers, and the PMI software tools include natural language processing (NLP) algorithms (also referred to as natural language processing) that include (or work with) a variety of machine learning (ML) algorithms. In general, the NLP algorithms used in accordance with aspects of the invention allow a computer system to query natural language data in data repositories and apply elements of language processing, information retrieval, and ML to derive meaning from the natural language inputs and potentially take action based on the derived meaning. Because a monitoring host system in accordance with aspects of the invention includes NLP (or semantic) capabilities and a variety of ML (or cognitive) capabilities, such a monitoring host system will be referred to herein as a content-based semantic monitoring host system.

In aspects of the invention, the NLP algorithms are configured to receive or retrieve from data repositories two general types of NL data. The first type of NL data is described herein as operational data, which means structured and unstructured natural language descriptions of performance problems identified for an application computer program running a computing system. In general, structured data includes additional data (e.g., metadata) that describe some aspect of the structured data. Unstructured data does not include any additional data (e.g., metadata) and the only information provided about eh unstructured data is the unstructured data itself. There are a variety of sources operational data. For example, operational data can come from application problem descriptions on tickets that have been opened for the subject application in connection with the overall PMI system. Operational data can come from outside the PMI system. For example, a web crawler can be used to monitor the web (e.g., a particular blog) for descriptions of problems that have been experienced by end-users of the subject application.

The second type of NL data is described herein as functionality data, which means NL descriptions of functional capabilities of the application computer program. There are a variety of sources of functionality data. For example, functionality data can come from user manuals, updates to user manuals, advertisements, product announcements, and similar written documents that describe how the application software is supposed to operate. In some instances, the functionality data can include NL descriptions of the importance of the functional capability. In the previously described example of what the phrase "content-based semantic monitoring" means, the assessment in the application's user manual that highlights the automated DPR dating feature as one of the application's important new functions would be included among the functionality data retrieved by the NLP algorithms.

In aspects of the invention, the NLP and ML algorithms are configured to apply elements of language processing and machine learning to derive meaning from the operational data and functionality data and to identify correlations between the operational data and the functionality data. For example, the ML algorithms include classification algorithms (also referred to as classifiers) that receive the operational data and the functionality data as training data. In embodiments of the invention, the NLP and ML algorithms are configured to limit the size of the training data by filtering the data according to a filtering standard (or filtering parameters). For example, the NLP and ML algorithms can be configured to process the training data to eliminate therefrom operational data (e.g., tickets) that identifies problems that are currently being monitored. In another example, the NLP and ML algorithms can be configured to process the training data to eliminate therefrom operational data (e.g., tickets) that identify problems for which a resolution has already been identified. Other training data filtering standards/parameters can be devised and implemented, including, for example, filtering out tickets with non-informative resolutions or filtering out tickets with generic resolutions. Reducing and focusing the training data that is input to the classification algorithms can improve the accuracy, efficiency and effectiveness of the classification algorithm outputs.

In aspects of the invention, the NLP, ML and classification algorithms are configured to apply confidence levels (CLs) to various ones of their results/determinations in order to improve the overall accuracy of the particular result/determination. When the NLP, ML or classification algorithm makes a determination or generates a result for which the value of CL is below a predetermined threshold (TH) (i.e., $CL<TH$), the result/determination can be classified as having sufficiently low "confidence" to justify a conclusion that the determination/result is not valid. If $CL>TH$, the determination/result can be considered valid and the determination/result can participate in downstream processing. Many different predetermined TH levels can be provided. The determinations/results with $CL>TH$ can be ranked from the highest $CL>TH$ to the lowest $CL>TH$ in order to prioritize when, how and if the determinations/results are handled in downstream processing.

In accordance with aspects of the invention, the classification algorithms extract features from the operational data and the functionality data. Any suitable feature extraction technique can be used including, for example, topic modeling techniques. Latent Dirichlet Allocation (LDA) is an example of a suitable topic modeling technique. In NLP, LDA is a generative statistical model that allows sets of observations to be explained by unobserved groups that explain why some parts of the data are similar. For example, if observations are words collected into documents, LDA posits that each document is a mixture of a small number of topics and that the creation of each word is attributable to one of the document's topics.

In embodiments of the invention, the classification algorithms are configured to use the extracted features to create a correlation model that can be used to identify pairings between operational data and functionality data, wherein the operational data has a correlation with the functionality data. As used herein, the terms "correlate," "correlation," and their equivalents mean that one phenomenon is related in some way to another phenomenon. The correlation can be defined in a number of ways. For example, the correlation between a particular item of operational data and a particular item of functionality data can be defined as the extent to which the operational data and the functionality data both describe aspects of the same specific output of the subject application. Using the previously described example of what the phrase "content-based semantic monitoring" means, the end-users who experienced an anomalous DPR output could contact the application's vendor about the anomalous DPR output, which would result in the vendor creating a ticket that describes the anomalous output(s) experienced by the end-user(s). In this example, the operational data would be the ticket(s), and the functionality data would be the portions of the application's user manual that describe the expected functioning of the DPR automated date function. The classification algorithms would extract features from the above-described ticket(s) and the DPR automated date function described in the application user manual in order to create a correlation model that would identify a correlation between the NL descriptions in the above-described ticket(s) and the DPR automated date function described (in NL) in the application user manual. The correlation would be based on a determination by the classification algorithms and the correlation model that the above-described ticket(s) (i.e., the operational data) and the DPR descriptions in the application user manual (i.e., the functionality data) both describe aspects of the DPR output functionality (i.e., the same specific output) of the subject application.

As another example, the correlation between a particular item of operational data and a particular item of functionality data can also be defined as the extent to which the operational data and the functionality data both describe aspects of the subject application that fall under the same topic(s). Using again the previously described example of what the phrase "content-based semantic monitoring" means, the end-users who experienced an anomalous DPR output could contact the application's vendor about the anomalous DPR output, which would result in the vendor creating a ticket that describes the anomalous output(s) experienced by the end-user(s). Again, the operational data would be the ticket(s), and the functionality data would be the portions of the application's user manual that describe the expected functioning of the DPR automated date function. The classification algorithms would extract features from the above-described ticket(s) and the DPR automated date function described in the application user manual in order to create a correlation model that would identify a correlation between the above-described ticket(s) and the DPR automated date function described in the application user manual. The correlation would be based on a determination by the classification algorithms and the correlation model that the above-described ticket(s) (i.e., the operational data) and the DPR descriptions in the application user manual (e.g., the functionality data) both describe aspects of the application software that fall under the same topic, namely the automated date function of the DPR functionality.

In aspects of the invention, the correlation between operation/functionality data pairs (or sets) can be determined using a similarity metric technique. In general, similarity metric techniques are used to determine the similarity between two things. A similarity score can be developed by quantifying different attributes of data objects, and employing different similarity algorithms across those attributes to yield similarity scores between the different data objects. For example, a group of people can be represented electronically as data objects whose attributes are tastes in movies. A similarity metric can be used to find the people who are similar based measuring how similar are their tastes in movies. Examples of suitable similarity metric techniques include, for example, Euclidean Distance techniques, Pearson Coefficient techniques, Jaccard Coefficient techniques, and the like.

As previously noted, in aspects of the invention the NLP, ML and classification algorithms are configured to apply CLs to various ones of their results/determinations in order to improve the overall accuracy of the particular result/determination. More specifically, in aspects of the invention the correlations between operational data and functionality data are prioritized by applying a ranking process. For example, the classification algorithms can be configured to determine CLs for the determined correlations between operational data and functionality data. When the classification algorithm determines that the value of CL for a given operation/functionality data pairing is below a predetermined threshold (TH) (i.e., CL<TH), the correlation between the operational/functionality data pairing can be classified as sufficiently low to justify a classification of "no correlation" between the operation/functionality data pairing. If CL>TH, the correlation between the operational/functionality data pairing can be classified as sufficiently high to justify the classification algorithm determining that there is a correlation between the operation/functionality data pairing. Many different predetermined TH levels can be provided. The operational/functionality data pairings with CL>TH can be ranked from the highest CL>TH to the lowest CL>TH.

In embodiments of the invention, CL can be weighted based on a number of factors, including, for example, the frequency at which a particular correlation is found. For example, using again the previously described example of what the phrase "content-based semantic monitoring" means, if multiple (e.g., 10 plus) end-users experience the same anomalous DPR output, a correlation between that anomalous DPR output and the DPR automated date function described in the application user manual could be appropriately weighted to reflect the higher frequency at which this correlation is found. In embodiments of the invention, the weighting the correlations can be used by the NLP, ML and/or classification algorithms to move a given operational/functionality data pair/set up in priority.

In embodiments of the invention, the content-based semantic monitoring host includes an automation module that receives pairs or sets of operational data that have been correlated with functionality data. The received pairs/sets of operational data correlated with functionality data are also prioritized based at least in part on the various CLs used by the NLP, ML and classification algorithms. The automation module is configured to select the prioritized, received pairs/sets of operational/functionality data based on a variety of prioritization standards. For example, the automation module can be configured to select received pairs/sets of operational/functionality data based on a determination that a correlation (e.g., a similarity metric) of the received pairs/sets of operational/functionality data is above a threshold. In another example, the automation module can be configured to select received pairs/sets of operational/functionality data based on a determination that any or all of the CLs of the received pairs/sets of operational/functionality data are above one or more thresholds.

The automation module is configured to use the NL data and other information associated with the selected pair/set of correlated operational/functionality data to create, automatically, a content-based semantic monitoring algorithm targeted to monitor content of outputs generated by the application program in order to identify additional instance of the content-based application program problems identified in the operational data of the selected pair/set of correlated operational/functionality data. In embodiments of the invention, the content-based semantic monitoring algorithm is implemented as a content-based semantic API that periodically places a content-based load (e.g., make a request) on monitored portion(s) of the target application and brings back the response that results from the content-based load. The automation module analyzes the NL data and other information associated with the selected pair/set of correlated operational/functionality data to determine the portion of the application software that will be monitored. Using again the previously described DPR example, the automation module would analyze the NL data and other information associated with the selected pair/set of correlated operational/functionality data and could determine that the content-based semantic API will monitor whether all DPRs produced by the application program include the current date in the upper left hand corner.

The automation module is also configured to use the NL data and other information associated with the selected pair/set of correlated operational/functionality data to create rules and apply those rules to the responses received at the content-based semantic API in order to determine if the responses are anomalous or non-anomalous. Using again the previously described DPR example, if a response to the API inquiry indicates that the current date is in the upper left corner of the end-user requested DPR, the response is non-anomalous, and no action is taken. If a response to the API inquiry indicates that the current date is not in the upper left corner of the end-user requested DPR, the response is anomalous, and the automation module is configured to automatically generate a natural language description of the anomaly (e.g., the current date on the DPR is in the lower right corner of the DPR), record the description of the anomaly in a ticket, and generate an alert that is provided to the appropriate entity to address the anomaly.

In embodiments of the invention, the content-based semantic monitoring host system includes an execution module that receives the content-based semantic API from the automation module and executes it. In embodiments of the invention, the execution module is configured to use the anomalous outputs that result from executing the content-based semantic API as a guide to automatically create test cases to assist in uncovering the root cause of the anomaly. As previously noted, test cases are small programs that are run on an operating system to verify quality. Examples of suitable programs to automatically create such test cases include Cucumber.js, Nightwatch.js, and the like. In embodiments of the invention, the execution module is further configured to feed the outputs that result from executing the content-based semantic API back to the classification algorithms as additional training data.

Accordingly, a PMI system in accordance with aspects of the invention overcomes the shortcoming of the prior art by configuring a variety of computer hardware tools and software tools to automatically identify content-based application software performance problems, prioritize the identified content-based application software performance problems, generate/implement semantic monitoring systems (e.g., APIs) targeted to the identified and prioritized content-based application software problems, and utilize the outputs of the semantic monitoring system to train and make learning-based adjustments to the novel and automated semantic monitoring techniques. PMI systems configured in accordance with aspects of the invention are not metric-based, which means that they are not limited to monitoring temporal aspects of an application's performance that can be measured and captured numerically. Thus, aspects of an application's performance that cannot be captured numerically (i.e., content-based performance issues) are not missed using a PMI system in accordance with aspects of the invention. Embodiments of the invention use cognitive computing techniques such as NLP, ML and classifiers to automatically make strategic decisions about what to monitor, how to prioritize anomalous results that are returned by the monitor, and how to make necessary adjustments to what is being monitored over time. Thus, setting up and maintaining an automated and content-based semantic application monitoring system in accordance with aspects of the invention saves a significant amount of time and resources.

Turning now to a more detailed description of aspects of the invention, FIG. 1 depicts an example of a PMI system 100 capable of implementing embodiments of the present invention. As shown in FIG. 1, the PMI system 100 includes a monitoring host system (e.g., a server, a virtual machine, a processor, a container, and the like) 110, an application host system (e.g., a server, a virtual machine, a container, a processor, and the like) 130, a general database 160, and a special database 120, configured and arranged as shown. Although the hosts 110, 130 are depicted as separate components, in practice, the functions performed by the separate components 110, 130 can be consolidated to a single host component, distributed to more than two host components, or merged into other components or infrastructure (not shown). Similarly, although the databases 120, 160 are depicted as separate database components, in practice, the functions performed by the separate database components 120, 160 can be consolidated to a single component, distributed among more than two components, or merged into other components or infrastructure (not shown). The application host 130 includes a web browser 132 configured to execute request over a network (e.g., the Internet) and return responses from other hosts (e.g., websites), which are typically the form of content (e.g., web pages 134) that can be displayed to a user (not shown). The special database 120 receives content-based application semantic data from a variety of sources, including, but not limited to, the monitoring host 110, the database 160, the alerts 150, the graphs/report 170, user documentation, and the like. The content-based semantic data is generally in the form of natural language descriptions about content-based semantic problems in the application under monitoring 136. The content-based semantic data is also in the form of natural language descriptions about how the application under monitoring 136 is designed to function.

In its general functionality, the monitoring host 110 applies metric-based general purpose monitoring to diverse information technology (IT) infrastructure resources such as networks and compute nodes. Specifically, the monitoring host 110 implements metric-based application monitoring using an application monitoring computer programs (not shown) that measure the metric values from monitored applications (e.g., application under monitoring 136). The monitoring host 110 stores the collected metrics into the database 160, analyses them, and sends alerts 150 when anomalous metrics are detected. The monitoring host 110 can send alerts to interested parties based on an anomalous event, using, for example, e-mail, SMS audible alerts, and the like, as alerting mechanisms. The monitoring host 110 also generates graphs and reports (e.g., trending reports and SLA reports) 170 based on the monitored metrics retrieved from the database 160.

Figure 2:
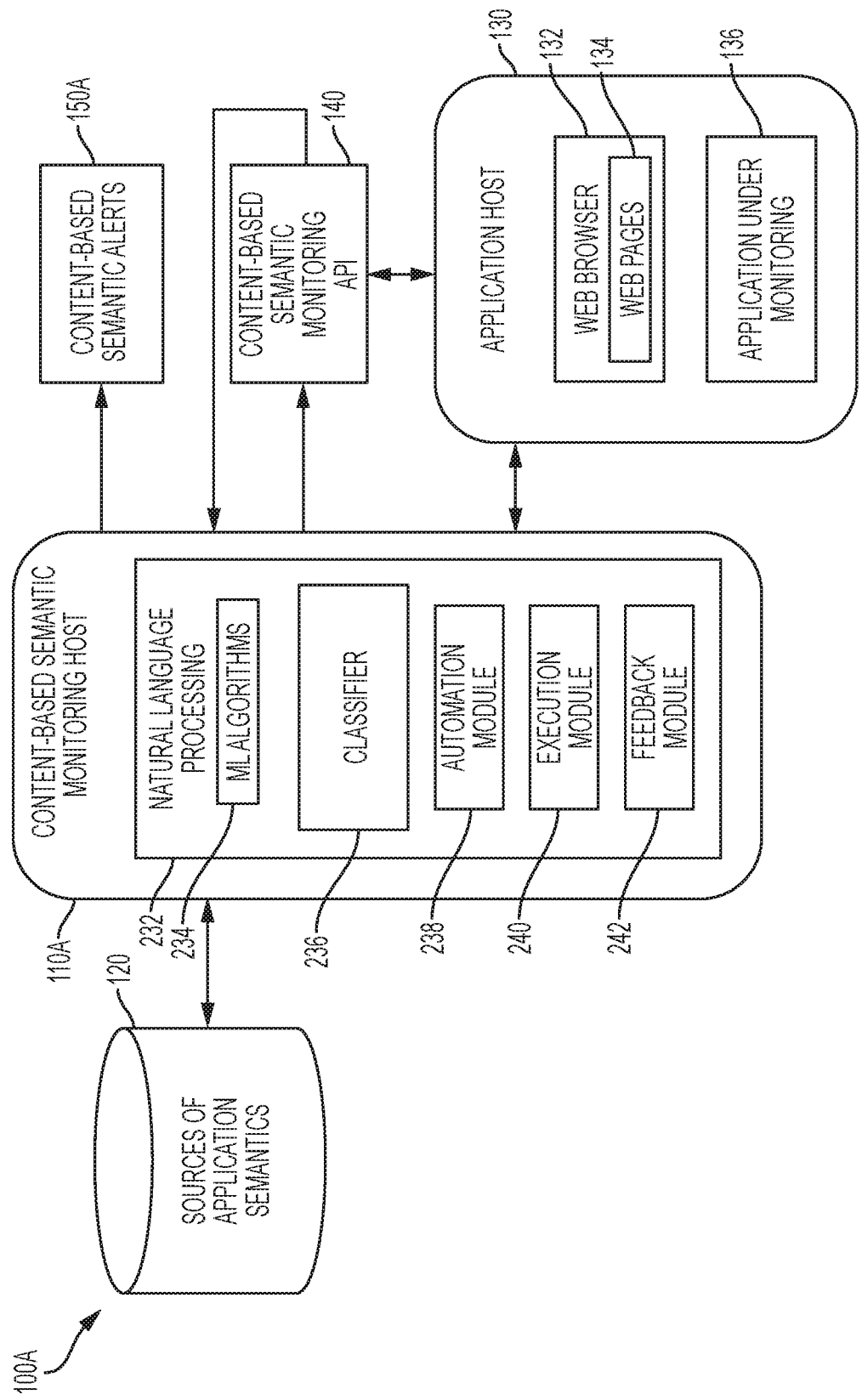
FIG. 2 is a block diagram of a portion of a PMI system embodying aspects of the invention.

The monitoring host 110 is also configured to, in accordance with aspects of the invention, automatically generate and execute a content-based semantic monitoring API 140 and generate alerts 150 therefrom. Additional details of how the monitoring host 110 automatically generates the content-based semantic API 140 is shown in FIG. 2 and described in subsequent paragraphs. Referring still to FIG. 1, the content-based semantic monitoring API 140 issues requests to and receives responses from the application under monitoring 136, which is running on the application host 130. In accordance with aspects of the invention, the requests issued by the API 140 are configured and arranged to monitor the content-based outputs of the application under monitoring 130. As used in this specification, the phrase "content-based outputs" means outputs that represent the content of what an application software program (e.g., application under monitoring 136) returns to and displays for the end-user. The monitoring operations applied by the API 140 are targeted based on content-based software problems that have been identified and prioritized by the monitoring host 110. The API 140 generates, using the monitoring host 110, alerts 150, which, according to aspects of the invention, are content-based semantic alerts (e.g., content-based semantic alerts 150A shown in FIG. 2).

FIG. 2 depicts a PMI system 100A, which is a more detailed illustration of a portion of the PMI system 100 (shown in FIG. 1). More specifically, PMI system 100A shows additional details of how a content-based semantic monitoring host 110A of the monitoring host 110 (shown in FIG. 1) can be implemented. Although not shown in FIG. 2, the content-based semantic monitoring host 110A interacts with the database 160 and the graphs/reports 170 in substantially the same way as the monitoring host 110. As shown in FIG. 2, the PMI system 100A includes the content-based semantic monitoring host 110A, the application host 130, and the special database 120, configured and arranged as shown. In accordance with aspects of the invention, the content-based semantic monitoring host 110A is configured and arranged to execute a variety of cognitive algorithms and modules, including, for example, a NLP algorithm 232, a ML algorithm 234, a classifier algorithm 236, an automation module 238, an execution module 240, and a feedback module 242.

In embodiments of the invention, the NLP algorithm 232 is configured to query natural language the special database 120 and apply elements of language processing, information retrieval, and the ML algorithms 234 to derive meaning from the natural language information in the special database 120. The classifier algorithm 236 is configured to extract features from received data (e.g., the special database 120) in order to "classify" the received data and uncover relationships between and among the classified data. Examples of suitable classifiers include but are not limited to neural networks, support vector machines (SVMs), logistic regression, decision trees, hidden Markov Models (HMMs), etc. The classifier algorithm 236 uses the extracted features in order to, over time, create/train/update a unique "model" in the form of a correlation model such that data can be applied to the model to determine its class and the relationship between and among the classes. As used herein, the terms "correlate," "correlation," and their equivalents mean that one phenomenon is related in some way to another phenomenon. The learning or training performed by the classifier algorithm 236 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In aspects of the invention, the NLP, ML, and classifier algorithms 232, 234, 236 are configured to process (by NLP and ML algorithms 232, 234) and classify (by classifier algorithm 236) two general types of NL data, namely operational data and functionality data. Operational data includes NL descriptions of performance problems identified for the application under monitoring 136. There are a variety of sources of operational data, including, but not limited to tickets that have been opened for the application under monitoring 136, as well as a web crawler (not shown) that monitors the web (e.g., a particular blog) for descriptions of problems that have been experienced by end-users of the application under monitoring 136. Functionality data is NL descriptions of functional capabilities of the application under monitoring 136. There are a variety of sources of functionality data, including, but not limited to user manuals, updates to user manuals, advertisements, product announcements, and similar written documents that describe how the application under monitoring 136 is supposed to operate. In some instances, the functionality data can include NL descriptions of the importance of the functional capability.

In aspects of the invention, the operational data and functionality data can be stored with no pre-classification, and the NLP, ML, and classifier algorithms 232, 234, 236 would classify and associate the data. In aspects of the invention, the operational data and functionality data can be pre-classified by, for example, storing operational data and functionality data in certain locations in the special database 120. For example, all ticket and web crawler data can be stored in memory locations with the prefix A in the special database 120, and all user manual documentation data can be stored in memory locations with the prefix B in the special database 120. The NLP, ML, and classifier algorithms 232, 234, 236 can be configured to look for operational data in memory locations with the prefix A, and to look for functionality data in memory locations with the prefix B. The NLP, ML, and classifier algorithms 232, 234, 236 can either accept the pre-classification as accurate, or can perform a more streamlined verification classification of the pre-classified data. In embodiments of the invention, the NLP, ML, and classifier algorithms 232, 234, 236 are configured to limit the size of the training data by filtering the data according to a filtering standard (or filtering parameters). For example, the NLP, ML, and classifier algorithms 232, 234, 236 can be configured to process the training data to eliminate therefrom operational data (e.g., tickets) that identifies problems that are currently being monitored, operational data that identify problems for which a resolution has already been identified, tickets with non-informative resolutions, and tickets with generic resolutions. Reducing and focusing the training data that is input to the NLP, ML, and classifier algorithms 232, 234, 236 can improve the accuracy, efficiency and effectiveness of their outputs. In aspects of the invention, the NLP, ML, and classifier algorithms 232, 234, 236 are configured to apply confidence levels (CLs) to various ones of their results/determinations in order to improve the overall accuracy of the particular result/determination. In embodiments of the invention, the above-described "correlation model" can be used to identify pairings between operational data that has a correlation with functionality data.

In embodiments of the invention, the content-based semantic monitoring host 110A includes an automation module 238 and an execution module 240. In embodiments of the invention, the automation module 238 receives pairs or sets of operational data that have been correlated with functionality data. The received pairs/sets of operational data correlated with functionality data are also prioritized based at least in part on the various CLs used by the NLP, ML, and classifier algorithms 232, 234, 236. The automation module 238 is configured to select the prioritized, received pairs/sets of operational/functionality data based on a variety of prioritization standards. The automation module 238 is further configured to use the NL data and other information associated with the selected pair/set of correlated operational/functionality data to create, automatically, the content-based semantic API 140, which is targeted to monitor content of outputs generated by the application under monitoring 136 in order to identify additional instance of the content-based application program problems identified in the operational data of the selected pair/set of correlated operational/functionality data. In embodiments of the invention, the API 140 periodically places a content-based load (e.g., make a request) on monitored portion(s) of the application under monitoring 136 and brings back the response that results from the content-based load. The automation module 238 analyzes the NL data and other information associated with the selected pair/set of correlated operational/functionality data to determine the portion that will be monitored in the application under monitoring 136.

The automation module 238 is also configured to use the NL data and other information associated with the selected pair/set of correlated operational/functionality data to create rules that will be applied to the responses received at the content-based semantic API 140 in order to determine if the responses are anomalous or non-anomalous. If a response to an inquiry by the API 140 is non-anomalous, no action is taken. If a response to the inquiry by the API 140 is anomalous, the automation module 238 is configured to automatically generate a natural language description of the anomaly, record the description of the anomaly in a ticket, and generate the content-based semantic alert 150A.

In embodiments of the invention, the execution module 240 receives the content-based semantic API 140 from the automation module and executes it. In embodiment of the invention, the execution module is configured to use the anomalous outputs that result from executing the content-based semantic API 140 as a guide to automatically create test cases to assist in uncovering the root cause of the anomaly. As previously noted, test cases are small programs that are run on an operating system to verify quality. Examples of suitable programs to automatically create such test cases include Cucumber.js, Nightwatch.js, and the like. In embodiments of the invention, a feedback module 242 is further configured to feed the outputs that result from executing the content-based semantic API 140 back to the classification algorithms 236 as additional training data.

Figure 3:
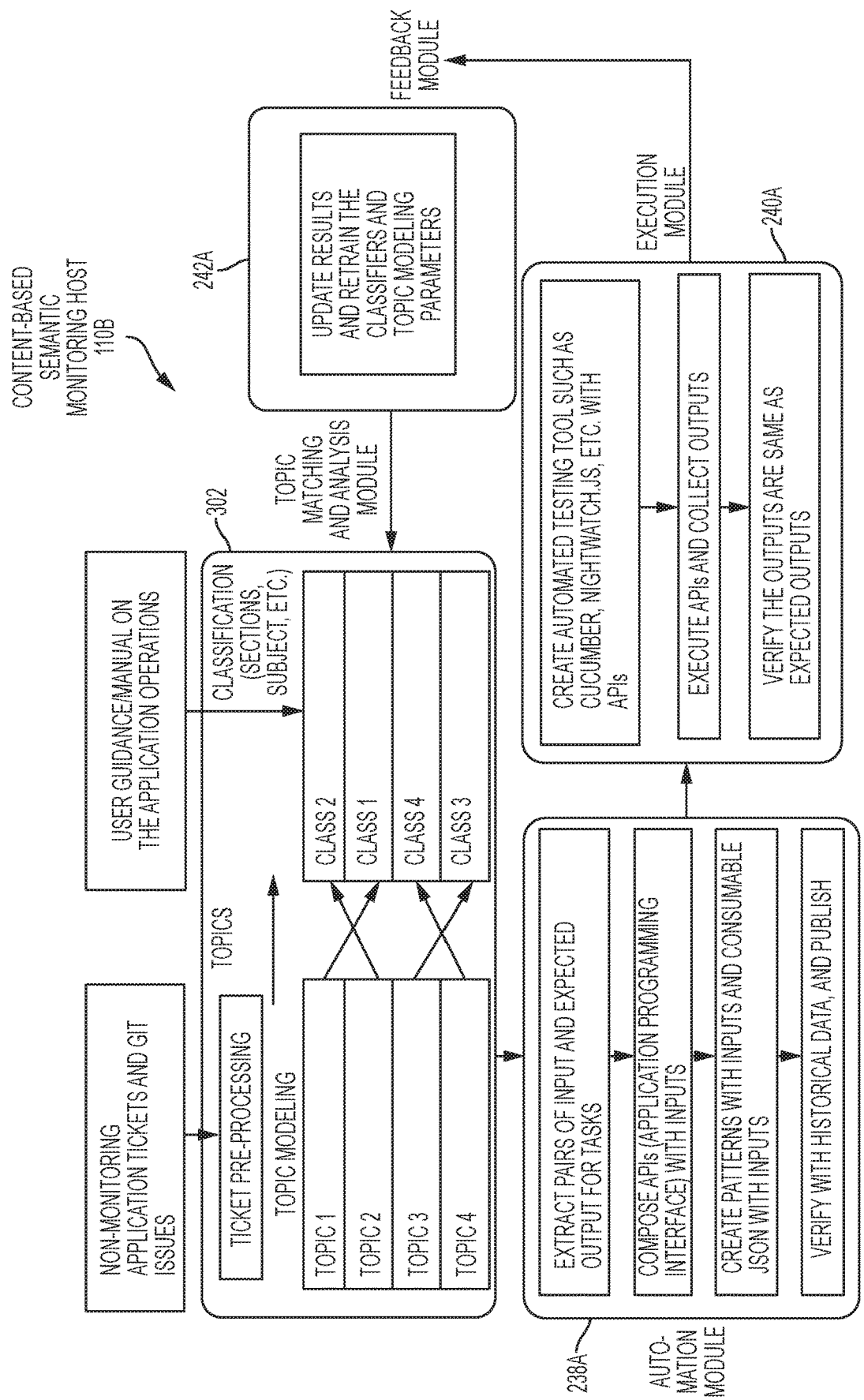
FIG. 3 is a block diagram of a portion of a PMI system embodying aspects of the invention

FIG. 3 depicts a content-based semantic monitoring host 110B, which is a more detailed illustration of the content-based semantic monitoring host 110A (shown in FIG. 2). More specifically, the content-based semantic monitoring host 110B shows additional details of how the content-based semantic monitoring host 110A of the monitoring host 110 (shown in FIG. 1) can be implemented. Although not shown in FIG. 3, the content-based semantic monitoring host 110B interacts with the general database 160, the graphs/reports 170, the special database 120, the application host 130, and the content-based semantic API 140 in substantially the same way as the monitoring host 110 and the content-based semantic monitoring host 110A. As shown in FIG. 3, in accordance with aspects of the invention, the content-based semantic monitoring host 110B is configured and arranged to execute a variety of cognitive algorithms and modules, including, for example, a topic matching and analysis module 302, an automation module 238A, an execution module 240A, and a feedback module 242A, configured and arranged as shown. In embodiments of the invention, the operations performed by the topic matching and analysis module 302 uses cognitive algorithms including, for example, the NLP, ML, and classifier algorithms 232, 234, 236 (shown in FIG. 2). The automation, execution, and feedback modules 238A, 240A, 242A perform the substantially the same functions as the automation, execution and feedback modules 238, 240, 242 shown in FIG. 2, expect the automation, execution, and feedback modules 238A, 240A, 242A provide additional details about how aspects of the invention can be implemented.

The content-based semantic monitoring host 110B shown in FIG. 3 will now be described with reference to FIG. 3, as well as, where relevant, with references (shown parenthetically) to the methodology 400 shown in FIG. 4. In embodiments of the invention, the content-based semantic monitoring host 110 implements the methodology 400. The topic matching and analysis module 302 of the content-based semantic monitoring host 110B receives NL non-monitoring tickets and NL user documentation (blocks 416, 402, 404) and applies topic modeling to place the data into classes and organize the classes into topics (blocks 418, 406). The topics are correlated with the classes (block 408), and the automation module 238A extracts pairs of inputs (non-monitored application issues) and expected outputs (how the application issue is supposed to operate) that are used to automatically construct APIs (e.g., API 140 shown in FIG. 2). Patterns are then created with the inputs using, for example, JSON (JavaScript Object Notation) (410, 412, 414). The API is then verified with historical data and published. The execution module 240A receives the API and uses it to automatically create testing tools guided by the application issues targeted by the automatically created API. The execution module 240A also executes the API, collects outputs generated by the API, and verifies whether the API outputs are anomalous. Anomalous API outputs are used to automatically generate electronic tickets and alerts. The feedback module 242A receives the above-described data generated by the execution module 240A and uses that data to update results and retrain the classifiers and topic modeling parameters used by the topic matching and analysis module 302.

Additional details of how aspects of the content-based semantic monitoring host 110B shown in FIG. 3 can be implemented will now be described with reference to FIG. 3, as well as, where relevant, to the diagrams and charts shown in FIGS. 4-8. Referring now to FIGS. 3, 4, 5, and 6, the topic matching and analysis module 302 (shown in FIG. 3) receives ticket data to perform ticket pre-processing. In general, so-called "Git" tickets are stored in a defect database (e.g., general database 160 and/or special database 120 shown in FIGS. 1 and 2). In known computer systems, a defect database is a database of all historical problem areas where a fix to a software problem was provided. For the portions of a software system that are being monitored by PMI, tickets are produced automatically by the PMI system. For issues that result in areas that are not being monitored, the tickets associated with such issues are developed manually. A non-limiting example of how such tickets can be processed manually proceeds as follows. When a new, unidentified and unmonitored potential problem is identified with a software system in the field, a problem management record (PMR) is opened on a case-by-case basis by the software support team. Every PMR receives a unique identification number (e.g., table 502 shown in FIG. 5), and all communication and support activities are handled under this number. A software support specialist attempts to isolate the identified error and detect the failing database software component (e.g., a module). When the problem is reproducible and isolated, an authorized program analysis report (APAR) is opened. Thus, an APAR is a named issue within the subject software program, and is opened after a customer or software support personnel discover a problem with the database software code. Every APAR has a unique identification number. After the subject software's development team solves the problem defined in the APAR, the database software fixes will be provided to customers. High impact pervasive (HIPER) APARs are critical problem areas of which all customers should be aware.

Figure 4:
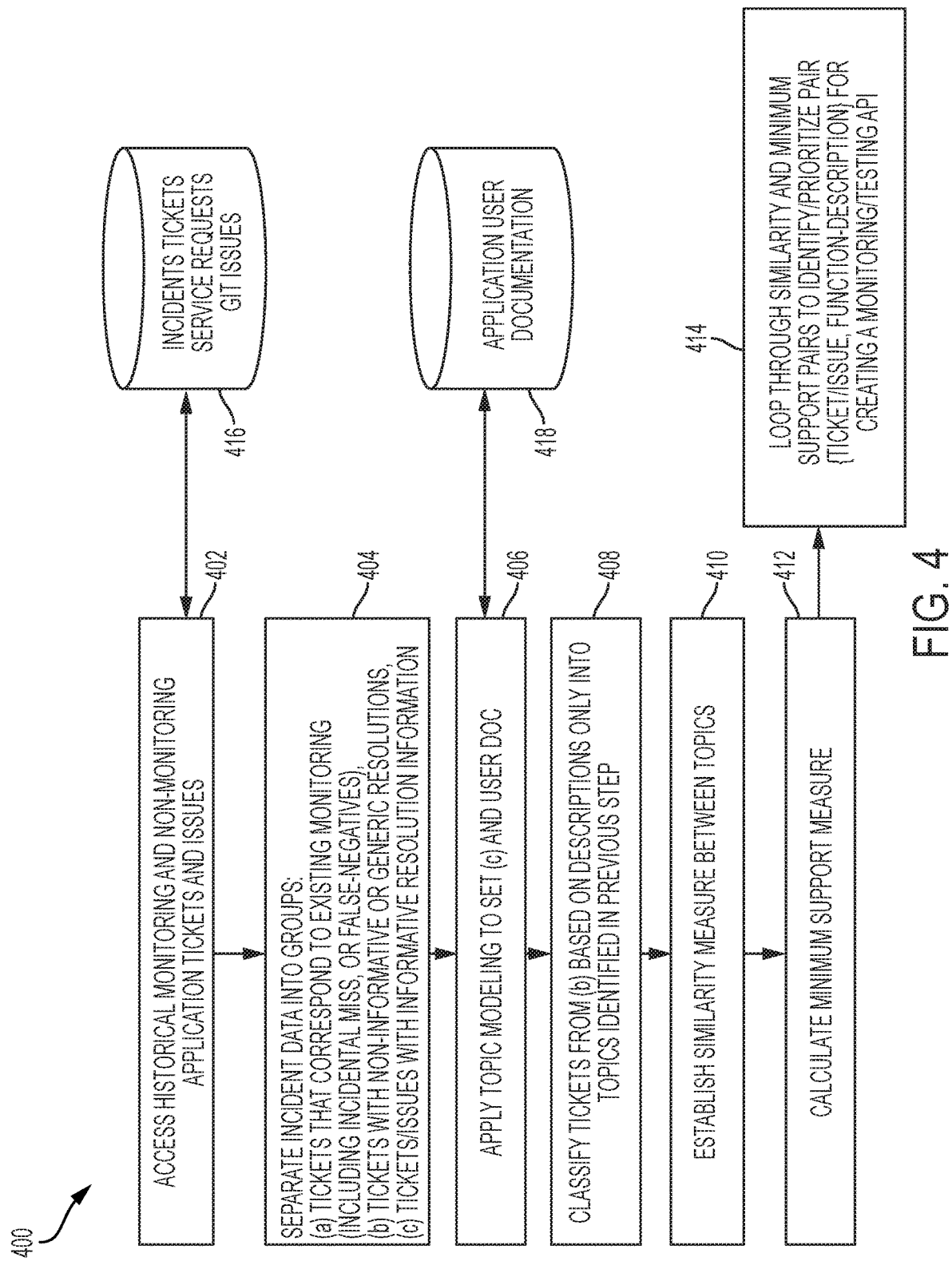
FIG. 4 is a flow diagram illustrating a methodology embodying aspects of the invention.
Figure 6:
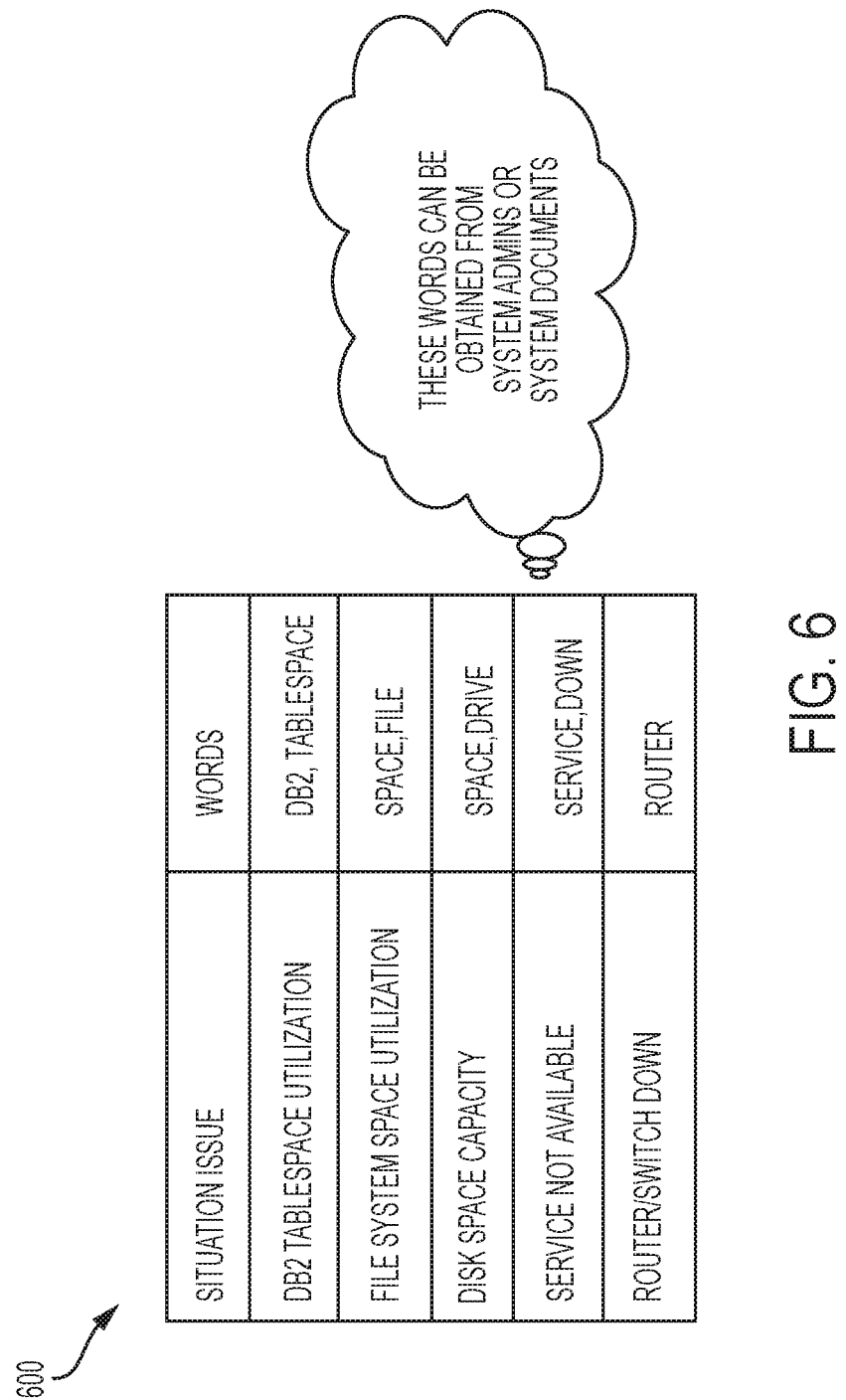
FIG. 6 is a diagram illustrating aspects of the invention.

Referring still to the topic matching and analysis module 302 shown in FIG. 3, the methodology 400 shown in FIG. 4, and the diagrams 502, 504 shown in FIG. 5, the analysis module 302 separate tickets (block 404) into the following groups: (a) tickets that correspond to existing monitoring (including accidental miss, or false-negatives); (b) tickets with non-informative or generic resolutions; and (c) tickets/issues with informative resolution information. The tickets falling under group (c) are classified into hierarchical topics related to semantic content or functionality of the service/application. Feature extraction is applied to represent both the event and resolution information using topic-level features obtained via the LDA (Latent Dirichlet Allocation) model. Tickets are defined as a collection of topic-level attributes (e.g., diagram 504 shown in FIG. 5) in which each ticket is considered as probability distribution of topics. The topics can be organized according to a hierarchy in which more abstract topics are near the root of the hierarchy and more concrete topics are near the leaves.

The topic matching and analysis module 302 can, in some embodiments of the invention, filter tickets to remove all monitoring tickets and manual tickets that correspond to existing monitoring. One approach is to use some domain words to narrow down the training ticket scope (e.g., table 600 shown in FIG. 6). A binary classifier (e.g., SVM) can be built on the selected tickets. For a given ticket, the label "1" can mean that the ticket is a false negative, and the label "0" can mean that the ticket is not a false negative. To perform the training ticket selection, a relevance score is computed for each manual ticket and all tickets are ranked based on the score. The top "k" tickets in the ranked list are selected, where k is a predefined parameter. Given a ticket "T," the relevance score can be computed using the equation: score $(T)=\max\{|w(T) \cap M_1|, \ldots, |w(T) \cap M_1|\}$, where w(T) is the word set of tickets T, I is the number predefined situations, $M_i$ is the given domain word set for the $_i$-th situation, $i=1, \ldots, 1$. Thus, the score is the largest number of the common words between the ticket and the domain words.

Figure 7:
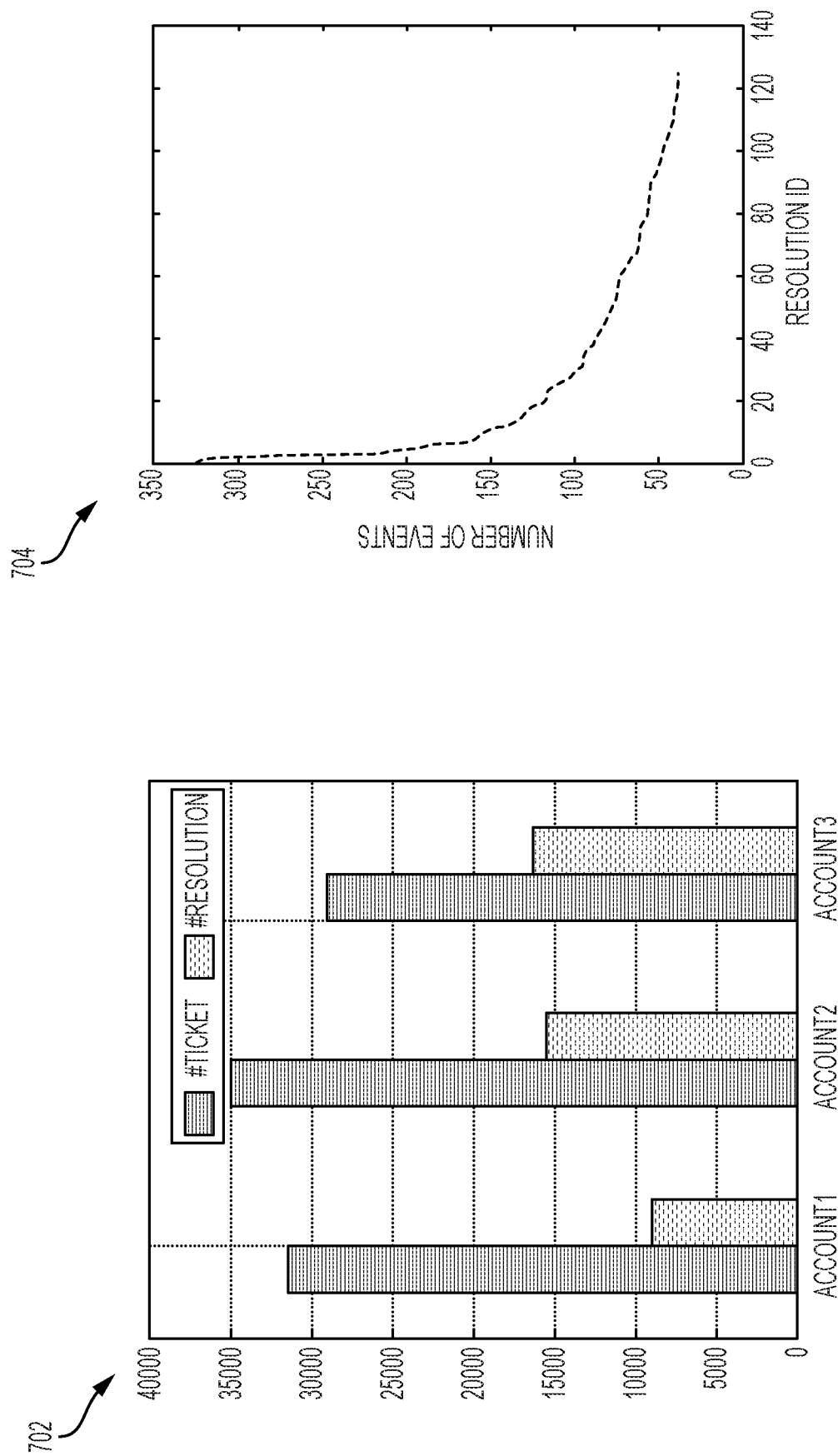
FIG. 7 is a diagram illustrating aspects of the invention.

For tickets that fall under group (b) non-informative or generic resolutions, the topic matching and analysis module 302 can utilize the following approach, which is illustrate by diagrams 702, 704 shown in FIG. 7. The collected ticket sets from the three accounts are denoted by "account1," "account2" and "account3," respectively. Diagram 702 shows the numbers of tickets and distinct resolutions, and diagram 704 shows the top repeated resolutions in "account1" denoted by "resolution ID." It is noted that a single resolution can resolve multiple monitoring tickets. In other words, multiple tickets share the same resolutions. All historical tickets are divided into two sets, namely the informative and non-informative tickets, respectively. The historical tickets are divided using the following method. A type predictor is used to predict whether the incoming ticket is informative or non-informative. Tickets are then classified based on their symptom, i.e., describing parameters (descriptions, source_system, created by, etc) and resolution describing parameters (resolution, resolution_code, resolver_group, etc.). A similarity (e.g., similarity metric) between symptom and resolution classes. Tickets with a resolution class that maps into multiple symptom classes with low similarity measure represent non-informative resolutions.

The topic modeling feature extraction technique (block 406) used by the topic matching and analysis module 302 can be a LDA technique. As previously noted herein, in NLP, LDA is a generative statistical model that allows sets of observations to be explained by unobserved groups that explain why some parts of the data are similar. For example, if observations are words collected into documents, LDA posits that each document is a mixture of a small number of topics and that the creation of each word is attributable to one of the document's topics.

Figure 8:
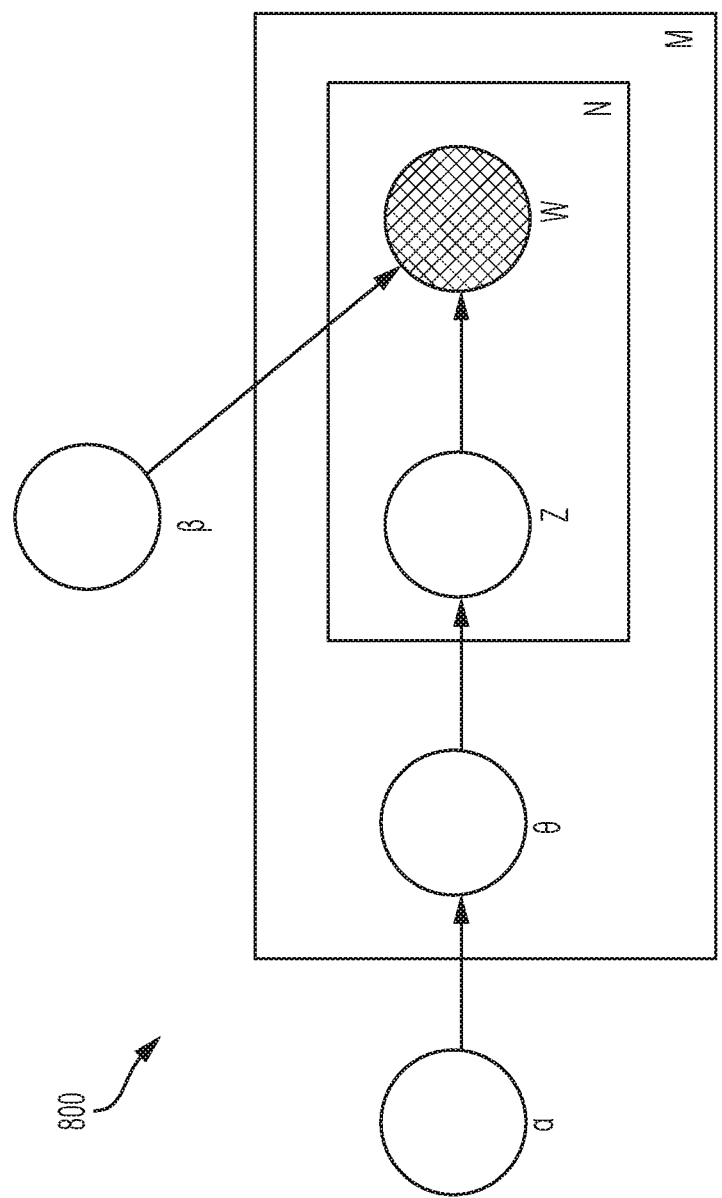
FIG. 8 is a diagram illustrating aspects of the invention.

In a suitable LDA technique, hidden topics are extracted then tickets and user documentation are encoded using topic level features. LDA is a generative probabilistic model of a document corpus. Its basic idea is that documents are represented as random mixtures over latent topics, where each topic is characterized by a distribution over words. Diagram 800 shown in FIG. 8 shows a graphical model representation of LDA. More specifically, the diagram 800 is a plate notation representing the LDA model; α is the parameter of the Dirichlet prior on the per-document topic distribution; β is the parameter of the Dirichlet prior on the per-topic word distribution; θi is the topic distribution for document i; φk is the word distribution for topic k; zij is the topic for the j-th word in document i; and wij is the specific word.

The following descriptions provide example steps for using LDA for feature extraction from the tickets in accordance with aspects of the invention. Each ticket is represented as a document by concatenating each attribute after stop words removal and tokenization. Historical tickets are used for training the LDA model. Feature vectors are inferred using the trained LDA model for historical tickets. LDA is also used for extracting features from user documents. A similarity measure is established between ticket classes and document (i.e., user documentation) classes. Minsup (i.e., minimum support) is defined as the minimum ratio of the number of tickets covered by the class and the total number of tickets for this workload/application (block 412). The two criteria (similarity and minsup) govern the performance of the LDA method. The LDA used in accordance with aspects of the invention prioritize establishing new monitoring for the ticket class based on minsup and similarity (e.g., above an established/chosen threshold).

Figure 9:
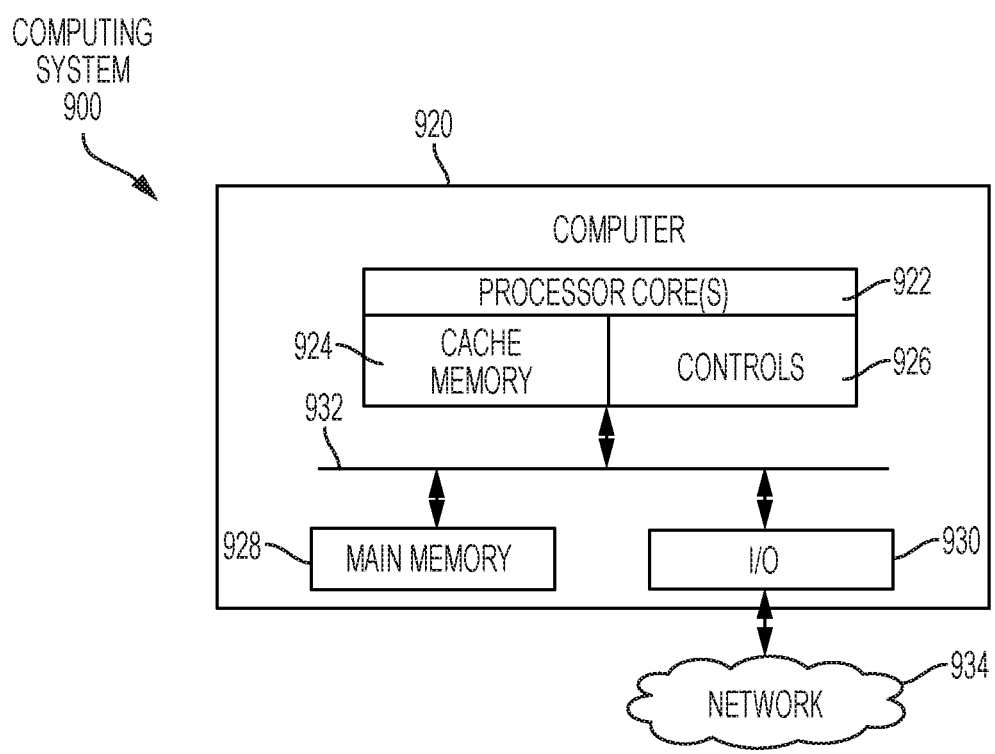
FIG. 9 is a computer system capable of implementing aspect of the invention.

FIG. 9 illustrates an example of a computer system 900 that can be used to implement the computer-based components of the systems 100, 100A, 110B shown in FIGS. 1-3. The computer system 900 includes an exemplary computing device ("computer") 902 configured for performing various aspects of the content-based semantic monitoring operations described herein in accordance aspects of the invention. In addition to computer 902, exemplary computer system 900 includes network 914, which connects computer 902 to additional systems (not depicted) and can include one or more wide area networks (WANs) and/or local area networks (LANs) such as the Internet, intranet(s), and/or wireless communication network(s). Computer 902 and additional system are in communication via network 914, e.g., to communicate data between them.

Exemplary computer 902 includes processor cores 904, main memory ("memory") 910, and input/output component(s) 912, which are in communication via bus 903. Processor cores 904 includes cache memory ("cache") 906 and controls 908, which include branch prediction structures and associated search, hit, detect and update logic, which will be described in more detail below. Cache 906 can include multiple cache levels (not depicted) that are on or off-chip from processor 904. Memory 910 can include various data stored therein, e.g., instructions, software, routines, etc., which, e.g., can be transferred to/from cache 906 by controls 908 for execution by processor 904. Input/output component(s) 912 can include one or more components that facilitate local and/or remote input/output operations to/from computer 902, such as a display, keyboard, modem, network adapter, etc. (not depicted).

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of operating a monitoring host of a performance management infrastructure system, the computer-implemented method comprising:
   receiving, using natural language processing (NLP) algorithms of the monitoring host, training data comprising operational data and functionality data;
   wherein the operational data represents natural language descriptions of performance problems identified for an application computer program running a computing system;
   wherein the functionality data represents natural language descriptions of functional capabilities of the application computer program;
   using the NLP algorithms and a classifier of the monitoring host to extract features of the training data and use the extracted features to build a semantic correlation model comprising correlated data sets, wherein each of the correlated data sets comprises functionality data and operational data having a semantic correlation to functionality data;
   selecting at least one of the correlated data sets; and
   using the at least one of the correlated data sets to create an application monitoring algorithm configured to submit requests to and receive responses from the application computer program running on the computing system.

2. The computer-implemented method of claim 1, wherein features extracted from the training data comprise topics under which the training data can be classified.

3. The computer-implemented method of claim 2, wherein the semantic correlation comprises semantic overlap between:
   topics under which the operational data of each of the correlated data sets can be classified; and
   topics under which the functionality data of each of the correlated data sets can be classified.

4. The computer-implemented method of claim 3 further comprising applying, using the classifier, a topic modeling process to the training data to extract the topics under which the training data can be classified.

5. The computer-implemented method of claim 4, wherein the topic modeling process comprises a Latent Dirichlet Allocation (LDA) modeling process.

6. The computer-implemented method of claim 1, wherein the application monitoring algorithm comprises an application programming interface (API) algorithm.

7. The computer-implemented method of 6, wherein:
   the requests submitted by the API algorithm are based at least in part on the operational data of the at least one of the correlated data sets; and
   the responses that are expected to be returned to the API algorithm are based at least in part on the functionality data of the at least one of the correlated data sets.

8. The computer-implemented method of claim 7 further comprising generating an alert based at least in part on a result of a comparison between the responses that are expected to be returned to the API algorithm and actual responses that have been returned to the API algorithm.

9. The computer-implemented method of claim 8, wherein the training data further comprises the alert.

10. The computer-implemented method of claim 1 further comprising generating, according to ranking criterion, a ranking for each of the correlated data sets, wherein selecting the at least one of the correlated data sets is based at least in part on the ranking for each of the correlated data sets.

11. The computer-implemented method of claim 10 wherein the ranking criterion comprise a confidence level determination.

12. The computer-implemented method of claim 10 wherein:
   the ranking comprises a similarity score; and
   generating the similarity scored comprises applying a similarity metric process.

13. The computer-implemented method of claim 10 wherein the ranking criterion comprises a determination of how often a type of semantic correlation occurs in the semantic correlation model.

14. A computer system comprising:
   a memory system; and
   a monitoring host communicatively coupled to the memory, wherein the monitoring host is configured to perform operations comprising;
   receiving, using natural language processing (NLP) algorithms of the monitoring host, training data comprising operational data and functionality data;
   wherein the operational data represents natural language descriptions of performance problems identified for an application computer program running a computing system;
   wherein the functionality data represents natural language descriptions of functional capabilities of the application computer program;
   using the NLP algorithms and a classifier of the monitoring host to extract features of the training data and use the extracted features to build a semantic correlation model comprising correlated data sets, wherein each of the correlated data sets comprises functionality data and operational data having a semantic correlation to functionality data;
   selecting at least one of the correlated data sets; and
   using the at least one of the correlated data sets to create an application monitoring (AM) algorithm configured to submit requests to and receive responses from the application computer program running on the computing system.

15. The computer system of claim 14, wherein:
   features extracted from the training data comprise topics under which the training data can be classified; and
   the semantic correlation comprises semantic overlap between:
      topics under which the operational data of each of the correlated data sets can be classified; and
      topics under which the functionality data of each of the correlated data sets can be classified.

16. The computer system of claim 14, wherein:
   the requests submitted by the AM algorithm are based at least in part on the operational data of the at least one of the correlated data sets; and
   the responses that are expected to be returned to the AM algorithm are based at least in part on the functionality data of the at least one of the correlated data sets.

17. The computer system of claim 16, wherein the operations performed by the monitoring host further comprises generating an alert based at least in part on a result of a comparison between the responses that are expected to be returned to the AM algorithm and actual responses that have been returned to the AM algorithm.

18. A computer program product for operating a monitoring host of a performance management system, the computer program product comprising a computer readable program stored on a computer readable storage medium, wherein the computer readable program, when executed on the monitoring host, causes processors of the monitoring host to perform a method comprising:

receiving, using natural language processing (NLP) algorithms of the monitoring host, training data comprising operational data and functionality data;

wherein the operational data represents natural language descriptions of performance problems identified for an application computer program running a computing system;

wherein the functionality data represents natural language descriptions of functional capabilities of the application computer program;

using the NLP algorithms and a classifier of the monitoring host to extract features of the training data and use the extracted features to build a semantic correlation model comprising correlated data sets, wherein each of the correlated data sets comprises functionality data and operational data having a semantic correlation to functionality data;

selecting at least one of the correlated data sets; and using the at least one of the correlated data sets to create an application monitoring (AM) algorithm configured to submit requests to and receive responses from the application computer program running on the computing system.

19. The computer program product of claim 18, wherein:

features extracted from the training data comprise topics under which the training data can be classified; and the semantic correlation comprises semantic overlap between:

topics under which the operational data of each of the correlated data sets can be classified; and topics under which the functionality data of each of the correlated data sets can be classified.

20. The computer program product of claim 19, wherein:

the requests submitted by the AM algorithm are based at least in part on the operational data of the at least one of the correlated data sets;

the responses that are expected to be returned to the AM algorithm are based at least in part on the functionality data of the at least one of the correlated data sets;

wherein:

the method performed by the monitoring host further comprises generating an alert based at least in part on a result of a comparison between the responses that are expected to be returned to the AM algorithm and actual responses that have been returned to the AM algorithm; and the training data further comprises the alert.

\* \* \* \* \*